United States Patent
Ku et al.

(10) Patent No.: US 11,095,120 B2
(45) Date of Patent: Aug. 17, 2021

(54) SURGE PROTECTION DEVICE

(71) Applicants: LITE-ON ELECTRONICS (GUANGZHOU) LIMITED, Guangzhou (CN); Lite-On Technology Corporation, Taipei (TW)

(72) Inventors: Po-Yi Ku, Taipei (TW); Chien-Lung Wang, Taipei (TW)

(73) Assignees: LITE-ON ELECTRONICS (GUANGZHOU) LIMITED, Guangzhou (CN); Lite-On Technology Corporation, Taipei (TW)

(*) Notice: Subject to any disclaimer, the term of this patent is extended or adjusted under 35 U.S.C. 154(b) by 167 days.

(21) Appl. No.: 16/443,886

(22) Filed: Jun. 18, 2019

(65) Prior Publication Data

US 2020/0235572 A1 Jul. 23, 2020

(30) Foreign Application Priority Data

Jan. 22, 2019 (CN) .......................... 201910057339.8

(51) Int. Cl.
| H02H 9/04 | (2006.01) |
| H02H 1/00 | (2006.01) |
| H02H 3/04 | (2006.01) |
| H02H 3/02 | (2006.01) |
| H02H 3/22 | (2006.01) |

(52) U.S. Cl.
CPC .......... *H02H 9/042* (2013.01); *H02H 1/0061* (2013.01); *H02H 3/025* (2013.01); *H02H 3/044* (2013.01); *H02H 3/22* (2013.01)

(58) Field of Classification Search
CPC .......... H02H 1/00; H02H 1/0061; H02H 3/02; H02H 3/025; H02H 3/04; H02H 3/044; H02H 3/22; H02H 3/24; H02H 9/04; H02H 9/042

See application file for complete search history.

(56) References Cited

U.S. PATENT DOCUMENTS

| 8,929,043 | B2* | 1/2015 | Kim ........................ H02J 50/12 |
| | | | 361/91.1 |
| 9,130,369 | B2* | 9/2015 | Kallal ..................... H02J 7/025 |
| 2017/0094747 | A1* | 3/2017 | Wang ..................... H05B 45/00 |
| 2018/0204101 | A1 | 7/2018 | De Jongh |
| 2019/0027921 | A1* | 1/2019 | Ku ........................... H02H 3/20 |
| 2019/0123544 | A1* | 4/2019 | Pelegris ................ H02H 3/207 |

FOREIGN PATENT DOCUMENTS

| CN | 208174675 | 11/2018 |
| TW | 201036328 | 10/2010 |
| TW | 201904156 | 1/2019 |

OTHER PUBLICATIONS

"Office Action of Taiwan Counterpart Application," dated Oct. 7, 2019, p. 1-p. 8.

* cited by examiner

*Primary Examiner* — Matthew V Nguyen
(74) *Attorney, Agent, or Firm* — JCIPRNET

(57) ABSTRACT

A surge protection device includes a surge protection circuit, a controller, and a wireless module. The surge protection circuit has a plurality of surge protection elements, receives a power source and correspondingly generates a sampling signal according to the power source. The controller compares a representative voltage value of the power source corresponding to the sampling signal with a first reference value to determine a using state of the surge protection circuit. The wireless module correspondingly transmits the using state to a remote server.

17 Claims, 3 Drawing Sheets

SURGE PROTECTION DEVICE

CROSS-REFERENCE TO RELATED APPLICATION

This application claims the priority benefits of China application serial no. 201910057339.8, filed on Jan. 22, 2019. The entirety of the above-mentioned patent application is hereby incorporated by reference herein and made a part of this specification.

BACKGROUND

Technical Field

The disclosure relates to a surge protection device, and more particularly to a surge protection device that can intelligently report a damaged state.

Description of Related Art

In a power supply system, when a power source is being supplied to a circuit apparatus, a surge overvoltage (or overcurrent) may occur if an abnormal overvoltage of the power source is encountered. When such a surge overvoltage is applied to the circuit apparatus, it may cause deterioration or damage of circuit elements.

Therefore, in the prior art, a surge protector is often used to provide protection for elements of the circuit apparatus against the surge overvoltage. However, when the surge protector is damaged due to an excessive surge overvoltage, the user cannot immediately learn whether the surge protector has been damaged and needs maintenance. Therefore, when the next surge overvoltage occurs, the surge overvoltage will directly impact the circuit apparatus at the back end with damages. However, the user cannot learn the damage of the surge protector until the circuit apparatus does not operate normally. Therefore, how to monitor the state of the surge protector in real time is an important issue.

SUMMARY

The disclosure provides a surge protection device that can intelligently detect and determine a damaged state of a circuit and report it in real time.

A surge protection device of the disclosure includes a surge protection circuit, a controller, and a wireless module. The surge protection circuit has a plurality of surge protection elements. The surge protection circuit receives a power source and correspondingly generates a sampling signal according to the power source. The controller is coupled to the surge protection circuit. The controller compares a representative voltage value of the power source corresponding to the sampling signal with a first reference value to determine a using state of the surge protection circuit. The wireless module is coupled to the controller and correspondingly transmits the using state to a remote server.

Based on the above, the surge protection device of the disclosure can perform a surge protection operation for the power source with the plurality of surge protection elements in the surge protection circuit, generate the sampling signal corresponding to the power source, use the controller to compare the representative voltage value of the power source corresponding to the sampling signal with the first reference value to determine the using state of the surge protection circuit at this time, and cause the wireless module to correspondingly transmit the using state to the remote server, so as to perform the real-time monitor of the using state of the surge protection circuit. Accordingly, the user can learn the current state of the surge protection circuit and determine if maintenance and repair are needed.

In order to make the aforementioned features and advantages of the disclosure comprehensible, embodiments accompanied with drawings are described in detail below.

DESCRIPTION OF THE EMBODIMENTS

Figure 1:
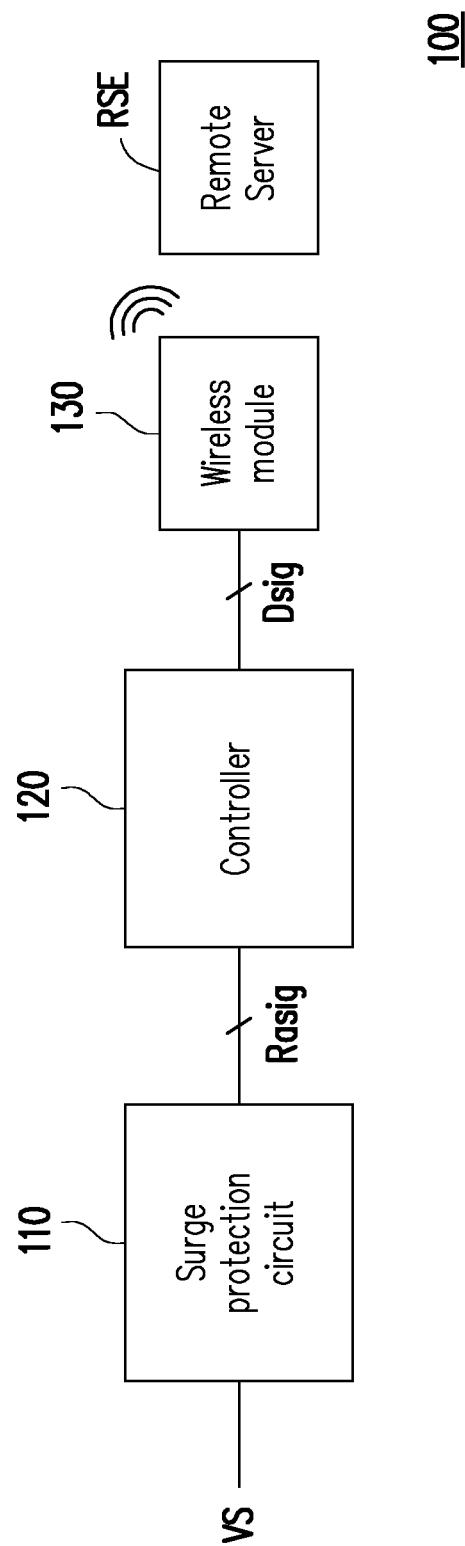
FIG. 1 is a schematic diagram of a surge protection device according to an embodiment of the disclosure.

Please refer to FIG. 1. FIG. 1 is a schematic diagram of a surge protection device according to an embodiment of the disclosure. A surge protection device 100 includes a surge protection circuit 110, a controller 120, and a wireless module 130. The surge protection circuit 110 has a plurality of surge protection elements (such as surge protection elements VR1 to VR3 shown in FIG. 3) and is configured to receive a power source VS, wherein the surge protection circuit 110 performs a surge protection operation on the power source VS with the plurality of surge protection elements and correspondingly generates a sampling signal Rasig according to the power source VS. The controller 120 is coupled to the surge protection circuit 110, and a first reference value is pre-set in the controller 120, wherein the controller 120 may obtain a representative voltage value of the power source VS corresponding to the sampling signal Rasig and compare the representative voltage value with the first reference value to determine the using state of the surge protection circuit 110, wherein the representative voltage value is a representative value corresponding to the voltage value of the power source VS corresponding to the current sampling signal Rasig.

The using state of the surge protection circuit 110 includes a normal state and a damaged state. The normal state is a state indicating that the surge protection circuit 110 can operate normally. The damaged state is a state indicating that the surge protection circuit 110 is damaged, for example, by the surge overvoltage of the power source VS. However, the disclosure is not limited to the above. When the controller 120 determines that the surge protection circuit 110 is in the damaged state, the controller 120 may generate a damage signal Dsig to the wireless module 130 and cause the wireless module 130 to upload the damage signal Dsig to a remote server RSE, thereby reporting the using state of the surge protection circuit 110 to the remote server RSE in real time.

It should be noted that the plurality of surge protection elements in the surge protection circuit 110 of the embodiment may be, for example, varistors. The controller 120 may be, for example, a micro controller unit (MCU). In addition, the wireless module 130 of the embodiment may be, for example, a global system for mobile communication (GSM) system, a personal handy-phone system (PHS), a code division multiple access (CDMA) system, a wireless fidelity (Wi-Fi) system, a worldwide interoperability for microwave access (WiMAX) system or a bluetooth wireless communication module, but embodiments of the disclosure are not limited thereto.

In detail, in the embodiment, the surge protection circuit 110 may receive the power source VS, and when a surge occurs in the power source VS, the surge protection circuit 110 performs the surge protection operation with the plurality of surge protection elements to absorb the surge of the power source VS, thereby preventing the circuit apparatus at the back end of the surge protection device from being damaged by the surge. When the voltage of the surge on the power source VS is too large (that is, the surge overvoltage is greater than the voltage protection specification of each of the surge protection elements), the excessive voltage of the surge will damage the surge protection elements, thereby causing the surge protection circuit 110 to be in the damaged state. At this time, the controller 120 further compares the representative voltage value of the power source VS corresponding to the sampling signal Rasig with the first reference value to determine the using state of the surge protection circuit 110.

In more detail, after receiving the power source VS, the surge protection circuit 110 may perform steps such as an overvoltage protection and a sampling operation on the voltage value (such as 220 volts AC voltage) of the power source VS and correspondingly generate a sampling voltage Rasig (which is, for example, 0 to 5 volts DC voltage but not limited thereto). The controller 120 may convert the received sampling voltage Rasig into the corresponding representative voltage value of the power source VS. For example, when the voltage value of the power source VS is 255 volts AC voltage, the voltage value of the sampling voltage Rasig received by the controller 120 may be, for example, 5 volts DC voltage. At this time, the controller 120 may identify the representative voltage value (such as 255 Vac) corresponding to the sampling voltage Rasig according to a built-in database (or a lookup table), wherein the representative voltage value is a representative value for the voltage value of the power source VS corresponding to the current sampling signal Rasig. For example, when the voltage value of the power source VS is 200 volts AC voltage, the representative voltage value at this time is 255 Vac; when the voltage value of the power source VS is 100 volts AC voltage, the representative voltage value at this time is 100 Vac, and so on. It should be noted that the setting of the conversion mode between the representative voltage value and the power source VS of the disclosure is not limited to the above-mentioned conversion mode. The above conversion mode is only an exemplary embodiment. Those skilled in the art can apply an existing conversion mode between the voltage value and the numerical value to the disclosure, which is not limited in the disclosure.

Next, the controller 120 may compare the converted representative voltage value (i.e., the representative value of the voltage value of the power source VS corresponding to the sampling voltage Rasig) with the first reference value (such as 5 Vac) pre-set in the controller 120. When the controller 120 determines that the representative voltage value of the power source VS corresponding to the sampling signal Rasig is less than the first reference value, it indicates that the voltage value of the sampling signal Rasig generated by the surge protection circuit 110 at this time is relatively small (such as zero volts or approaching zero volts), and the controller 120 may determine that at this time the surge protection circuit 110 is in the damaged state and generate the damage signal Dsig to the wireless module 130, so that the wireless module 130 uploads the damage signal Dsig to the remote server RSE to perform a real-time report of the damaged state, wherein the damage signal Dsig is for recording the damaged state of the surge protection circuit 110.

In addition, it should be noted that in other embodiments of the disclosure, the surge protection circuit 110 further has a plurality of fuse elements (such as fuse elements F1 to F2 shown in FIG. 3), wherein the plurality of fuse elements are coupled to the plurality of surge protection elements. When the plurality of surge protection elements are damaged by the surge of the power source VS and are in the damaged state (i.e., the surge overvoltage is greater than the voltage protection specification of each of the surge protection elements and thus damages each of the surge protection elements), the plurality of fuse elements can be blown by an overcurrent generated by the surge overvoltage of the power source VS, thereby disconnecting the current paths of the plurality of surge protection elements, so that the voltage value of the sampling signal Rasig generated by the surge protection circuit 110 becomes very small (i.e., the voltage is zero volts or approaches zero volts). The plurality of fuse elements may be, for example, thermal fuses. Since the current path of each of the damaged surge protection elements is disconnected by the fuse elements resulting from the damaged surge protection elements, the circuit apparatus at the back end can be prevented from being directly damaged by the surge overvoltage.

Based on the foregoing description, it is clear that in the surge protection device 100 of the disclosure, when the surge protection circuit 110 is in the damaged state due to the excessive voltage of the surge of the power source VS, the controller 120 can compare the representative voltage value of the power source VS corresponding to the voltage value of the sampling signal Rasig with the first reference value to learn the using state of the surge protection circuit 110, so as to detect whether the surge protection circuit 110 is in the damaged state. When determining that the surge protection circuit 110 is in the damaged state, the controller 120 can cause the wireless module 130 to upload the damage signal Dsig to the remote server RSE to perform the real-time report, so that the user can arrange to change the damaged surge protection circuit 110 according to the damage signal Dsig; therefore, the user can learn the damaged state of the surge protection circuit immediately and perform timely maintenance and repair.

Figure 2:
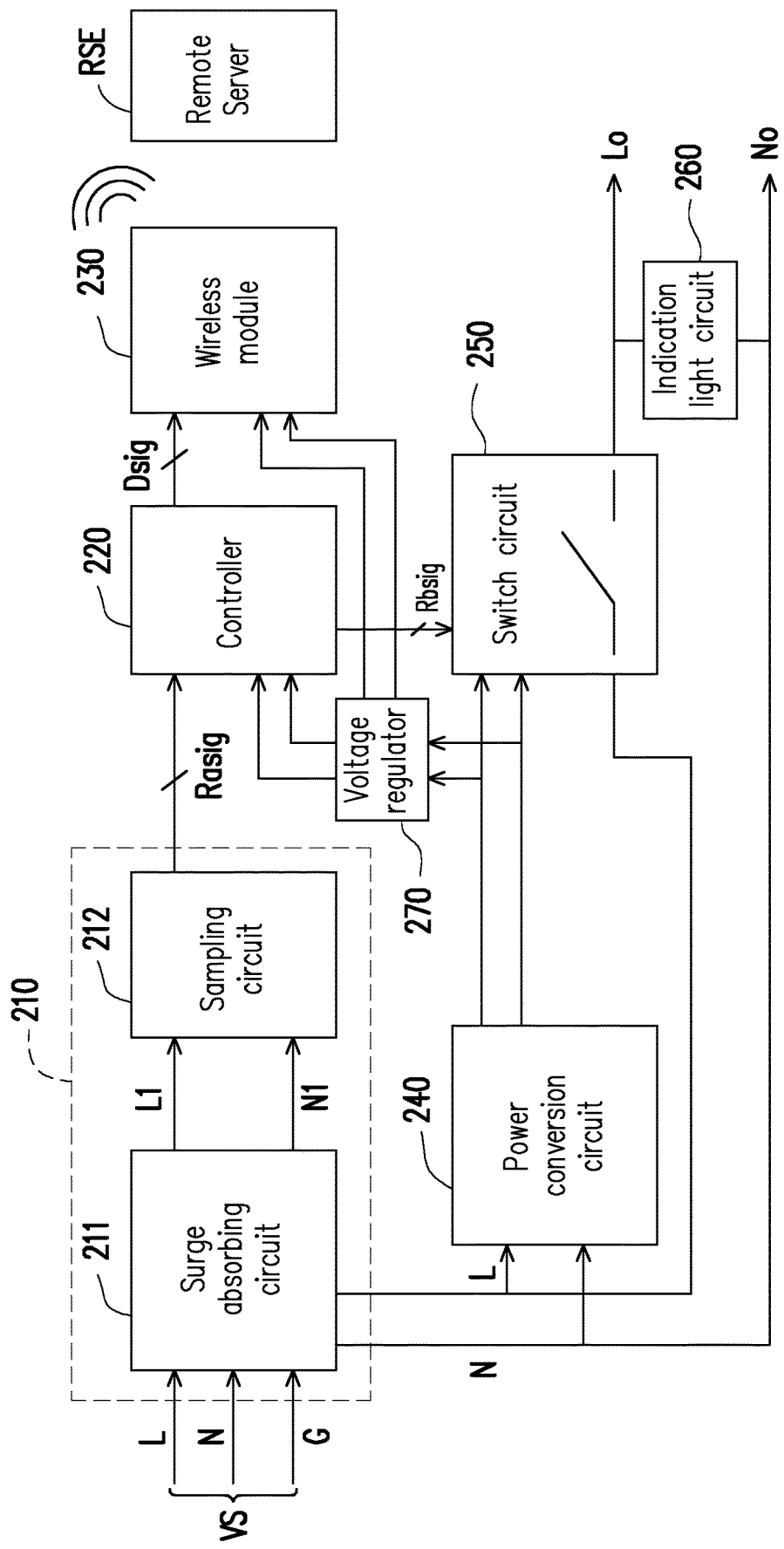
FIG. 2 is a schematic diagram of circuit blocks of a surge protection device according to another embodiment of the disclosure.

Please refer to FIG. 2. FIG. 2 is a schematic diagram of circuit blocks of a surge protection device according to another embodiment of the disclosure. The present embodiment differs from the previous embodiment in that the surge protection device 200 of the present embodiment includes a surge protection circuit 210, a controller 220, a wireless module 230, a power conversion circuit 240, a switch circuit 250, an indication circuit 260, and a voltage regulator 270. The surge protection circuit 210 includes a surge absorbing circuit 211 and a sampling circuit 212. The surge absorbing circuit 211 has a plurality of surge protection elements and receives a live wire voltage L, a neutral wire voltage N and a ground wire voltage G of the power source VS to generate a first live wire voltage L1 and a first neutral wire voltage N1. In addition, the surge absorbing circuit 211 performs a surge protection operation (i.e., an overvoltage protection operation) on the power source VS with the plurality of surge protection elements, wherein the power source VS of the present embodiment is a single-phase AC power source supplied by the mains system (which is, for example, a single-phase three-wire AC power source herein). The sampling circuit 212 is coupled to the surge absorbing circuit 211 and performs a step-down operation and a full-wave rectification operation on the first live wire voltage L1 and the first neutral wire voltage N1, and samples accordingly to generate the sampling signal Rasig.

The controller 220 is pre-set with the first reference value. The controller 220 may receive the sampling signal Rasig and compare the representative voltage value of the power source VS corresponding to the sampling signal Rasig with the first reference value to determine the using state of the surge protection circuit 210. When the voltage value of the power source VS corresponding to the sampling signal Rasig is greater than the first reference value, the controller 220 may determine that the surge protection circuit 210 is in the normal state. When the voltage value of the power source VS corresponding to the sampling signal Rasig is less than the first reference value, the controller 220 may determine that the surge protection circuit 210 is in the damaged state.

When the controller 220 determines that the surge protection circuit 210 is in the damaged state, the controller 220 generates the damage signal Dsig to the wireless module 230 and causes the wireless module 230 to upload the damage signal Dsig to the remote server RSE, wherein the wireless module 230 may, for example, upload the damage signal Dsig to the remote server RSE via the network to monitor and report the using state of the surge protection circuit 210. The remote server RSE may be, for example, a cloud storage or a cloud server, and the network may be, for example, a local area network (LAN) or the Internet, which is not limited in the disclosure.

Further, in the present embodiment, the power conversion circuit 240 is coupled to the surge protection circuit 210, receives the live wire voltage L and the neutral wire voltage N, and converts the live wire voltage L and the neutral wire voltage N into a first power source voltage and a second power source voltage to supply the first power source voltage to the controller 220 and the wireless module 230 as a power source and to supply the second power source voltage to the switch circuit 250 as a power source, wherein the first power source voltage is less than the second power source voltage. Further, after receiving the live wire voltage L and the neutral wire voltage N of the single-phase AC power source, the power conversion circuit 240 may rectify the live wire voltage L and the neutral wire voltage N to generate the first power source voltage and the second power source voltage that are DC voltages and supply the first power source voltage to the voltage regulator 270 to cause voltage regulator 270 to regulate the first power source voltage, so as to supply the first power source voltage to the controller 220 and the wireless module 230 via the voltage regulator 270. Additionally, the power conversion circuit 240 may supply the second power source voltage to the switch circuit 250.

It should be noted that the switch circuit 250 of the embodiment may be coupled to the controller 220 to be turned on or off according to the using state of the surge protection circuit 210, and the indication circuit 260 is coupled to the switch circuit 250 to indicate the using state of the surge protection circuit 210. For example, when the surge protection circuit 210 is in the normal state, the controller 220 may generate a control signal Rbsig to the switch circuit 250, and the switch circuit 250 is turned on according to the control signal Rbsig to cause the indication circuit 260 to perform an indication operation.

Further, in the embodiment, the sampling circuit 212 may receive the voltage value of the power source VS from the surge absorbing circuit 211 and perform a step-down operation and a full-wave rectification operation to correspondingly generate the sampling voltage Rasig with a smaller voltage value. In addition to being pre-set with the first reference value (such as 5 Vac described in the embodiment of FIG. 1), the controller 220 in the embodiment is further pre-set with a second reference value (such as 80 Vac), a third reference value (such as 60 Vac), a fourth reference value (such as 280 Vac), and a fifth reference value (such as 260 Vac), wherein the first reference value to the fifth reference value in descending order are the fourth reference value, the fifth reference voltage, the second reference value, the third reference value, and the first reference value. It should be noted that, for convenience of description, the disclosure provides five reference values as an exemplary embodiment. However, the disclosure does not limit the number and value of the reference values, and those skilled in the art may make adjustments according to the actual application.

Accordingly, the surge protection device 200 of the embodiment may use the controller 220 to compare the representative voltage value of the power source VS corresponding to the sampling voltage Rasig with a plurality of different reference values, thereby causing the surge protection device 200 to be operated in different modes. For example, when the representative voltage value of the power source VS corresponding to the sampling signal Rasig is less than the third reference value (such as 60 Vac) and greater than the first reference value (such as 5 Vac), the surge protection device 200 may be operated in a low voltage off mode, which indicates that the surge protection device 200 is in a low voltage state but not in the damaged state (i.e., the voltage value of the power source VS corresponding to the sampling signal Rasig is not less than the first reference value), and the controller 220 may provide the control signal Rbsig with a disable voltage level to the switch circuit 250, so that the switch circuit 250 is turned off according to the control signal Rbsig, and the indication circuit 260 is in the off mode according to the switch circuit 250 that has been turned off.

When the voltage value of the power source VS corresponding to the sampling signal Rasig is greater than or equal to the second reference value (such as 80 Vac), the surge protection device 200 may be operated in a low voltage start mode, and the controller 220 may provide the control signal Rbsig with an enable voltage level to the switch circuit 250, so that the switch circuit 250 is turned on according to the control signal Rbsig to cause the indication circuit 260 to perform the indication operation, and the surge protection device 200 may supply an output live wire voltage to an output live wire end Lo and supply an output neutral wire voltage to an output neutral wire end No.

In addition, when the voltage value of the power source VS corresponding to the sampling signal Rasig is greater than or equal to the fourth reference value (such as 280 Vac), the surge protection device 200 is operated in an overvoltage off mode, which indicates that the voltage value of the power source VS received by the surge protection circuit 210 is too high, and the controller 220 may provide the control signal Rbsig with the disable voltage level to the switch circuit 250, so that the switch circuit 250 is turned off according to the control signal Rbsig, and the indication circuit 260 is in the off mode according to the switch circuit 250 that has been turned off. When the voltage value of the power source VS corresponding to the sampling signal Rasig is reduced from greater than the fifth reference value (such as 260 Vac) to less than the fifth reference value, the surge protection device 200 is operated in an overvoltage recovery mode, and the controller 220 may provide the control signal Rbsig with the enable voltage level to the switch circuit 250, so that the switch circuit 250 is turned on according to the control signal Rbsig, and the indication circuit 260 performs the indication operation, and the surge protection device 200 may provide supply the output live wire voltage to the output live wire end Lo and supply the output neutral wire voltage to the output neutral wire end No.

In this way, the surge protection device 200 of the embodiment may determine the current using state (i.e. the normal state or the damaged state) of the surge protection circuit 210 by comparing the five different reference values with the representative voltage value of the power source VS corresponding to the sampling voltage Rasig and may adjust the operation mode of the surge protection device 200 when the surge protection circuit 210 is in the normal state according to the representative voltage value of the power source VS corresponding to the sampling voltage Rasig, so as to realize protection of the circuit apparatus at the back end in overvoltage or low voltage conditions.

Figure 3:
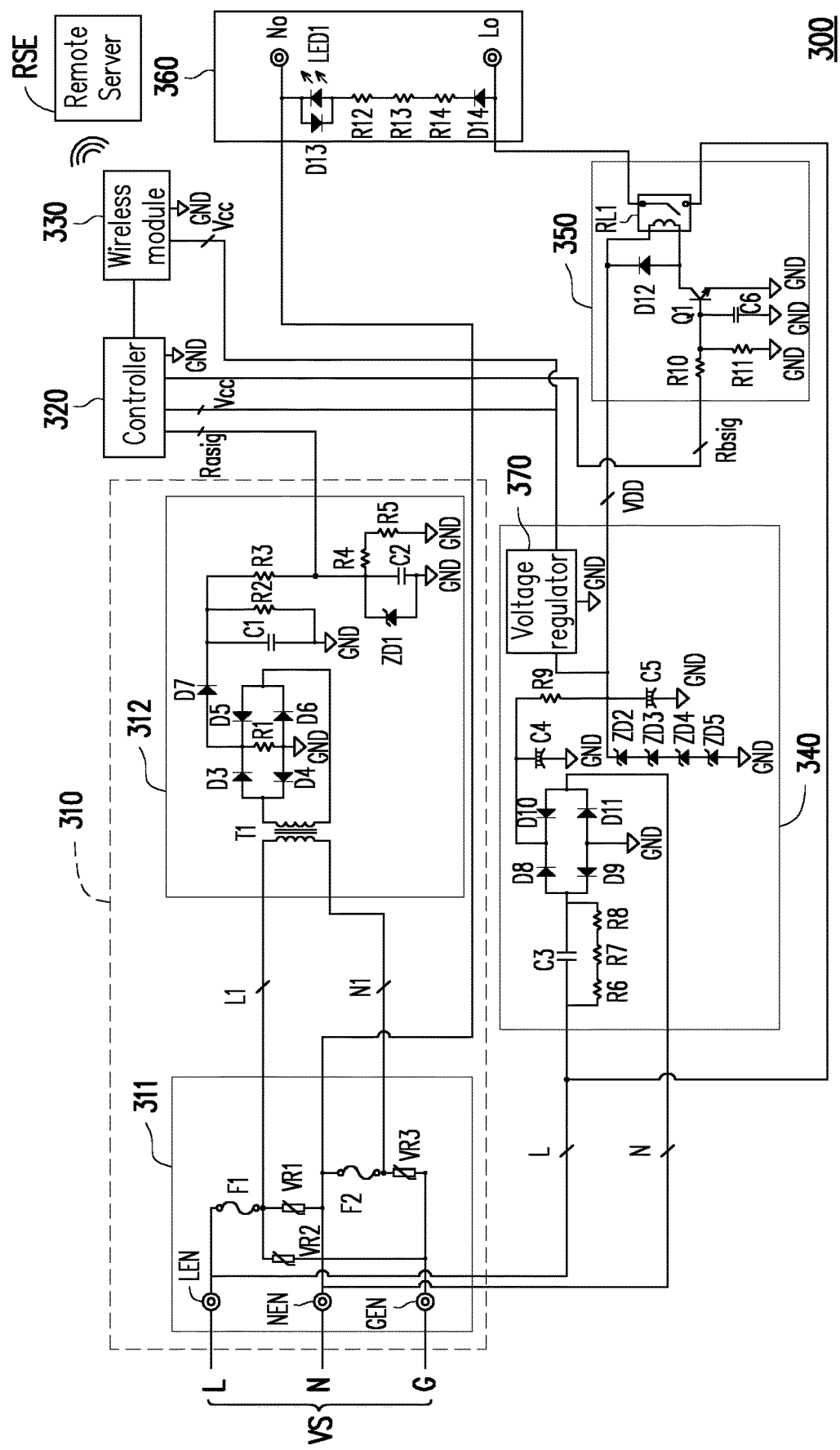
FIG. 3 is a schematic diagram of circuit blocks of a surge protection device according to another embodiment of the disclosure.

Please refer to FIG. 3. FIG. 3 is a schematic diagram of circuit blocks of a surge protection device according to another embodiment of the disclosure. The surge protection device 300 of the present embodiment includes a surge protection circuit 310, a controller 320, a wireless module 330, a power conversion circuit 340, a switch circuit 350, an indication circuit 360, and a voltage regulator 370. The surge protection circuit 310 includes a surge absorbing circuit 311 and a sampling circuit 312 and receives the live wire voltage L, the neutral wire voltage N and the ground wire voltage G in the power source VS; that is, the power source VS in this embodiment is a single-phase AC power source supplied by the mains system. In detail, the surge absorbing circuit 311 includes a live wire end LEN, a neutral wire end NEN, a ground wire end GEN, surge protection elements VR1 to VR3, and fuse elements F1 to F2. The live wire end LEN is configured to receive the live wire voltage L. The neutral wire end NEN is configured to receive the neutral wire voltage N. The ground wire end GEN is configured to receive the ground wire voltage G.

The first end of the fuse element F1 is coupled to the live wire end LEN, and the second end of the fuse element F1 is coupled to the first end of the surge protection element VR1. The surge protection element VR1 is coupled between the second end of the fuse element F1 and the neutral wire end NEN. The surge protection element VR2 is coupled between the second end of the fuse element F1 and the ground wire end GEN. The first end of the fuse element F2 is coupled to the neutral wire end NEN, and the second end of the fuse element F2 is coupled to the first end of the surge protection element VR3. The surge protection element VR3 is coupled between the second end of the fuse element F2 and the ground wire end GEN. Further, the surge absorbing circuit 311 supplies the first live wire voltage L1 to the sampling circuit 312 via the fuse element F1 and supplies the first neutral wire voltage N1 to the sampling circuit 312 via the fuse element F2.

Specifically, the surge absorbing circuit 311 of the embodiment may perform a surge protection operation on the power source VS with the surge protection elements VR1 to VR3; that is, the surge protection elements VR1 to VR3 of the embodiment can be connected in parallel to the live wire voltage L, the neutral wire voltage N, and the ground wire voltage G of the single-phase AC power source supplied by the mains system and be configured to suppress the surge of the single-phase AC power source (such as a surge generated by an abnormal overvoltage condition of the mains system or an overvoltage surge generated with induction by a power line of the mains system when struck by a lightning strike), wherein the surge protection elements VR1 to VR3 may be, for example, varistors, but the disclosure is not limited thereto.

In addition, it should be noted that in the embodiment, the surge protection elements VR1 and VR2 are connected in series with the fuse element F1, and the surge protection element VR1 is connected in series with the fuse element F2 so that when the surge protection elements VR1 and VR2 are abnormal (for example, when the surge voltage is too high and damages the surge protection elements VR1 and VR2), the fuse element F1 is blown by the high temperature of the excessive current to disconnect the current paths of the surge protection elements VR1 and VR2. Similarly, when the surge protection element VR3 is abnormal (for example, when the surge voltage is too high and damages the surge protection element VR3), the fuse element F2 is blown by the high temperature of the excessive current to disconnect the current path of the surge protection element VR3. In this way, the surge absorbing circuit of the disclosure can disconnect the current paths of the surge protection elements VR1 to VR3 by the fuse elements F1 and F2 being damaged, thereby protecting the surge protection device and the circuit apparatus at the back end from being directly damaged by the surge.

Further, the sampling circuit 312 includes a transformer T1, diodes D3 to D7, capacitors C1 to C2, resistors R1 to R5, and a Zener diode ZD1. The first end and the second end of the primary side of the transformer T1 receive the first live wire voltage L1 and the first neutral wire voltage N1, respectively, and the first end of the secondary side of the transformer T1 is coupled to the anode of the diode D3 and the cathode of the diode D4, and the second end of the secondary side of the transformer T1 is further coupled to the anode of the diode D5 and the cathode of the diode D6. The cathode of the diode D3 is coupled to the cathode of the diode D5. The anode of the diode D4 is further coupled to the anode of the diode D6 and a reference ground voltage GND. The first end of the resistor R1 is coupled to the cathode of the diode D3, and the second end of the resistor R1 is coupled to the reference ground voltage GND.

In addition, the anode of the diode D7 is coupled to the cathode of the diode D5, and the cathode of the diode D7 is further coupled to the first end of the capacitor C1, the first end of the resistor R2, and the first end of the resistor R3. The second end of the capacitor C1 is coupled to the reference ground voltage GND. The second end of the resistor R2 is also coupled to the reference ground voltage GND. The first end of the resistor R4 is further coupled to the controller 320, the first end of the capacitor C2, and the second end of the resistor R3. The second end of the resistor R4 is coupled to the first end of the resistor R5. The second end of the resistor R5 is coupled to the reference ground voltage GND. The first end of the capacitor C2 is coupled to the cathode of the Zener diode ZD1, and the second end of the capacitor C2 is coupled to the reference ground voltage GND. The anode of the Zener diode ZD1 is coupled to the reference ground voltage GND.

In this way, the sampling circuit 312 of the embodiment can be isolated from the secondary side of the transformer T1 by the primary side of the transformer T1 and step down the first live wire voltage L1 and the first neutral wire voltage N1 with the turns ratio of the primary side of the transformer T1 to the secondary side of the transformer T1, so as to generate an AC voltage on the secondary side of the transformer T1. In addition, the sampling circuit 312 rectifies the first live wire voltage L1 and the first neutral wire voltage N1 into a DC voltage through a bridge full-wave rectification circuit formed by the diodes D3 to D7, the resistors R1 to R2, and the capacitor C1 and uses the resistors R3 to R5 to divide the DC voltage to generate the sampling signal Rasig.

In addition, the controller 320 receives the power source voltage Vcc, the sampling signal Rasig, and the reference ground voltage GND to generate the control signal Rbsig and the damage signal Dsig. The wireless module 330 receives the power source voltage Vcc and the reference ground voltage GND and receives the damage signal Dsig for uploading it to the remote server RSE. The power conversion circuit 340 includes resistors R6 to R9, Zener diodes ZD2 to ZD5, diodes D8 to D11, capacitors C3 to C5, and the voltage regulator 370. The first end of the capacitor C3 receives the live wire voltage L from the live wire end LEN and is coupled to the first end of the resistor R6. The second end of the capacitor C3 is further coupled to the anode of the diode D8 and the cathode of the diode D9. The second end of the resistor R6 is coupled to the first end of the resistor R7. The second end of the resistor R7 is coupled to the first end of the resistor R8. The second end of the resistor R8 is coupled to the second end of the capacitor C3. The cathode of the diode D8 is coupled to the cathode of the diode D10. The anode of the diode D9 is further coupled to the anode of the diode D11 and the reference ground voltage GND. The anode of the diode D10 receives the neutral wire voltage N from the neutral wire end NEN and is coupled to the cathode of the diode D11.

The first end of the capacitor C4 is further coupled to the cathode of the diode D8 and the first end of the resistor R9. The second end of the capacitor C4 is coupled to the reference ground voltage GND. The first end of the capacitor C5 is further coupled to the second end of the resistor R9 and the cathode of the Zener diode ZD2. The second end of the capacitor C5 is coupled to the reference ground voltage GND. The cathode of the Zener diode ZD2 is coupled to the first end of the voltage regulator 370 and the switch circuit 350, and the anode of the Zener diode ZD2 is coupled to the cathode of the Zener diode ZD3. The anode of the Zener diode ZD3 is coupled to the cathode of the Zener diode ZD4. The anode of the Zener diode ZD4 is coupled to the cathode of the Zener diode ZD5. The anode of the Zener diode ZD5 is coupled to the reference ground voltage GND. The first end of the voltage regulator 370 is coupled to the first end of the capacitor C5. The second end of the voltage regulator 370 is coupled to the reference ground voltage GND. The third end of the voltage regulator 370 is coupled to the controller 320 and the wireless module 330 to supply the power source voltage Vcc.

It should be noted that, in the embodiment, the voltage regulator 370 is disposed in the power conversion circuit 340. In other words, the voltage regulator 370 of the disclosure may be disposed in the power conversion circuit 340 or may be disposed separately from the power conversion circuit 340 (such as the voltage regulator 270 of FIG. 2), which is not limited in the disclosure.

In detail, the power conversion circuit 340 of the embodiment may receive the live wire voltage L and the neutral wire voltage N from the live wire end LEN and the neutral wire end NEN, may be coupled through the capacitor C3 to rectify the live wire voltage L and the neutral wire voltage N into a DC voltage via the bridge full-wave rectification circuit formed by the diodes D8 to D11, may reduce the voltage ripple of the DC voltage through the capacitors C4 to C5 and the resistor R6, and may generate a power source voltage VDD with the regulator formed by series coupling of the Zener diode ZD2 to ZD4 and supply it to the switch circuit 350. Further, the power conversion circuit 340 may supply the power source voltage VDD to the voltage regulator 370 to have the voltage regulator 370 step down the power source voltage VDD to generate the power source voltage Vcc, so as to supply the power source voltage Vcc to the controller 320 and the wireless module 330.

In addition, the switch circuit 350 includes resistors R10 to R11, a capacitor C6, a diode D12, a transistor Q1, and a relay RL1. The first end of the resistor R10 receives the control signal Rbsig from the controller 320, and the second end of the resistor R10 is coupled to the first end of the resistor R11, the first end of the capacitor C6, and the control end of the transistor Q1. The second end of the resistor R11 is coupled to the reference ground voltage GND. The second end of the capacitor C6 is coupled to the reference ground voltage GND. The first end of the transistor Q1 is coupled to the anode of the diode D12, and the second end of the transistor Q1 is coupled to the reference ground voltage GND. The anode of the diode D12 is coupled to the second end of the first side of the relay RL1, and the cathode of the diode D12 is coupled to the first end of the first side of the relay RL1 and the power conversion circuit 340. The first end of the first side of the relay RL1 receives the power source voltage VDD. The first end of the second side of the relay RL1 is coupled to the indication circuit 360. The second end of the second side of the relay RL1 receives the live wire voltage L from the live wire end LEN. Noticeably, the transistor Q1 of the embodiment may be implemented, for example, by a metal oxide semiconductor field effect transistor (MOSFET) or a bipolar junction transistor (BJT). To simplify the description, the disclosure here is described with the bipolar junction transistor as an exemplary embodiment, and those skilled in the art can make adjustments according to actual application conditions, and the disclosure is not limited thereto.

In detail, after determining the state (such as the normal state or the damaged state) of the surge protection circuit 310 according to the sampling signal Rasig, the controller 320 may generate the control signal to the switch circuit 350. After receiving the control signal Rbsig from the controller 320, the switch circuit 350 may divide the voltage through the resistors R10 and R11 to supply a driving voltage to the control end of the transistor Q1, thereby causing the transistor Q1 to be turned on and pulling the voltage at the second end of the first side of the relay RL1 to the reference ground voltage GND. In this way, the first side of the relay RL1 may receive the power source voltage VDD, and the second side of the relay RL1 may be turned on according to the power source voltage VDD, so that the live wire voltage L can be supplied to the output live wire end Lo as the output live wire voltage.

The indication circuit 360 includes diodes D13 to D14, a light emitting diode LED1, and resistors R12 to R14. The anode of the diode D13 receives the neutral wire voltage N from the neutral wire end NEN, and the cathode of the diode D13 is coupled to the first end of the resistor R12 and the anode of the light emitting diode LED1. The second end of the resistor R12 is coupled to the first end of the resistor R13. The second end of the resistor R13 is coupled to the first end of the resistor R14. The second end of the resistor R14 is coupled to the cathode of the diode D14. The anode of the diode D14 is coupled to the output live wire end Lo. The cathode of the light emitting diode LED1 is coupled to the output neutral wire end No. Specifically, the indication circuit 360 of the embodiment may supply the live wire voltage L to the output live wire end Lo according to whether the switch circuit 350 is turned on or not, so as to generate the output live wire voltage to turn on the LED1, so that the indication circuit 360 emits light to indicate that the surge protection device 300 is currently in the normal state.

It should be noted that the ways in which the surge protection device 300 of the embodiment determines whether the surge protection circuit 310 is damaged, determines various operation modes when the surge protection circuit 310 is in the normal state, and reports by the wireless module 330 when the surge protection circuit 310 is in the damaged state are similar to those described in the embodiments of FIGS. 1 and 2. Those skilled in the art can complete the surge protection device 300 of the embodiment of FIG. 3 according to the foregoing descriptions of the embodiments of FIGS. 1 and 2, so the detailed description is not repeated here.

In summary, the surge protection device of the disclosure can perform the surge protection operation on the power source with the plurality of surge protection elements in the surge protection circuit, and the surge protection circuit can generate the sampling signal corresponding to the power source and use the controller to compare the representative voltage value of the power source corresponding to the sampling signal with the first reference value to determine the using state of the surge protection circuit. In addition, when determining that the surge protection circuit is in the damaged state, the controller can generate the damage signal and cause the wireless module to upload the damage signal to the remote server in real-time, so as to report the damaged state of the surge protection circuit. Accordingly, the user can learn the damaged state of the surge protection circuit immediately and perform timely maintenance and repair on the surge protection device.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A surge protection device, comprising:
   a surge protection circuit which has a plurality of surge protection elements, receives a power source and correspondingly generates a sampling signal according to the power source;
   a controller which is coupled to the surge protection circuit and compares a representative voltage value of the power source corresponding to the sampling signal with a first reference value to determine a using state of the surge protection circuit;
   a wireless module which is coupled to the controller and correspondingly transmits the using state to a remote server;
   a surge absorbing circuit which has the plurality of surge protection elements and performs a surge protection operation on the power source; and
   a sampling circuit which is coupled to the surge absorbing circuit and performs a step-down operation and a full-wave rectification operation on the power source on which the surge protection operation is performed, so as to generate the sampling signal.

2. The surge protection device according to claim 1, wherein the using state of the surge protection circuit comprises a normal state and a damaged state, and when the controller determines that the surge protection circuit is in the damaged state, the controller generates a damage signal to the wireless module and causes the wireless module to upload the damage signal to the remote server.

3. The surge protection device according to claim 2, wherein when a voltage value of the power source corresponding to the sampling signal is less than the first reference value, the controller determines that the surge protection circuit is in the damaged state, and the controller generates the damage signal for recording the damaged state to the wireless module, so as to cause the wireless module to upload the damage signal to the remote server.

4. The surge protection device according to claim 3, wherein when the voltage value of the power source corresponding to the sampling signal is greater than the first reference value, the controller determines that the surge protection circuit is in the normal state.

5. The surge protection device according to claim 4, wherein the surge protection device further comprises:
   a switch circuit coupled to the controller to be turned on or off according to the damaged state of the surge protection circuit; and
   an indication circuit coupled to the switch circuit to indicate the using state of the surge protection circuit,
   wherein when the surge protection circuit is in the normal state, the controller generates a control signal, and the switch circuit is turned on according to the control signal to cause the indication circuit to perform an indication operation.

6. The surge protection device according to claim 5, wherein the controller further has a second reference value, a third reference value, a fourth reference value, and a fifth reference value,
   wherein the first reference value to the fifth reference value in descending order are the fourth reference value, the fifth reference voltage, the second reference value, the third reference value, and the first reference value.

7. The surge protection device according to claim 6, wherein when the voltage value of the power source corresponding to the sampling signal is less than the third reference value and greater than the first reference value, the surge protection device is operated in a low voltage off mode, and the controller provides the control signal with a disable voltage level to the switch circuit, so that the switch circuit is turned off according to the control signal.

8. The surge protection device according to claim 6, wherein when the voltage value of the power source corresponding to the sampling signal is greater than or equal to the second reference value, the surge protection device is operated in a low voltage start mode, and the controller provides the control signal with an enable voltage level to the switch circuit, so that the switch circuit is turned on according to the control signal to cause the indication circuit to perform the indication operation.

9. The surge protection device according to claim 6, wherein when the voltage value of the power source corresponding to the sampling signal is greater than or equal to the fourth reference value, the surge protection device is operated in an overvoltage off mode, and the controller provides the control signal with a disable voltage level to the switch circuit, so that the switch circuit is turned off according to the control signal.

10. The surge protection device according to claim 6, wherein when the voltage value of the power source corresponding to the sampling signal is reduced from greater than the fifth reference value to less than the fifth reference value, the surge protection device is operated in an overvoltage recovery mode, and the controller provides the control signal with an enable voltage level to the switch circuit, so that the switch circuit is turned on according to the control signal to cause the indication circuit to perform the indication operation.

11. The surge protection device according to claim 1, wherein the surge protection circuit further has a plurality of fuse elements, the plurality of fuse elements being coupled to the plurality of surge protection elements, and when the plurality of surge protection elements are damaged by a surge of the power source and are in the damaged state, the plurality of fuse elements are blown according to the surge of the power source to disconnect current paths of the plurality of surge protection elements.

12. The surge protection device according to claim 11, wherein the power source is a single-phase AC power source supplied by a mains system.

13. The surge protection device according to claim 12, wherein the surge absorbing circuit receives a live wire voltage, a neutral wire voltage and a ground wire voltage of the single-phase AC power source to generate a first live wire voltage and a first neutral wire voltage, and performs the surge protection operation for the single-phase AC power source with the plurality of surge protection elements, wherein the sampling circuit performs a step-down operation and a full-wave rectification operation for the first live wire voltage and the first neutral wire voltage to generate the sampling signal.

14. The surge protection device according to claim 13, wherein the surge absorbing circuit comprises:

a live wire end for receiving the live wire voltage;
a neutral wire end for receiving the neutral wire voltage;
a ground wire end for receiving the ground wire voltage;
a first fuse element having a first end coupled to the live wire end;
a first surge protection element coupled between a second end of the first fuse element and the neutral wire end;
a second surge protection element coupled between the second end of the first fuse element and the ground wire end;
a second fuse element having a first end coupled to the neutral wire end; and
a third surge protection element coupled between a second end of the second fuse element and the ground wire end.

15. The surge protection device according to claim 13, wherein the surge protection device further comprises:

a power conversion circuit which is coupled to the surge protection circuit, receives the live wire voltage and the neutral wire voltage, and converts the live wire voltage and the neutral wire voltage into a first power source voltage and a second power source voltage to supply the first power source voltage to the controller and the wireless module and to supply the second power source voltage to the switch circuit, wherein the first power source voltage is less than the second power source voltage.

16. The surge protection device according to claim 1, wherein the plurality of fuse elements are thermal fuses.

17. The surge protection device according to claim 1, wherein the surge protection elements are varistors.

* * * * *